Dec. 9, 1958 D. D. WALTSCHEFF 2,864,016
ELECTROMAGNETIC TRANSMISSION TORQUE CONVERTER
Filed Nov. 28, 1955 6 Sheets-Sheet 1

INVENTOR.
Dimo Dimitroff Waltscheff
BY Robert E. Burns
Attorney

INVENTOR.
Dimo Dimitroff Waltscheff
BY
Robert E Burns
Attorney

Dec. 9, 1958  D. D. WALTSCHEFF  2,864,016
ELECTROMAGNETIC TRANSMISSION TORQUE CONVERTER
Filed Nov. 28, 1955  6 Sheets-Sheet 3

FIG. 4.

INVENTOR.
Dimo Dimitroff Waltscheff
BY Robert E. Burns
Attorney

Dec. 9, 1958 D. D. WALTSCHEFF 2,864,016
ELECTROMAGNETIC TRANSMISSION TORQUE CONVERTER
Filed Nov. 28, 1955 6 Sheets-Sheet 4

INVENTOR.
Dimo Dimitroff Waltscheff
BY Robert E. Burns
Attorney

INVENTOR.
Dimo Dimitroff Waltscheff
BY Robert E. Burns
Attorney

United States Patent Office 2,864,016
Patented Dec. 9, 1958

2,864,016

ELECTROMAGNETIC TRANSMISSION TORQUE CONVERTER

Dimo Dimitroff Waltscheff, New York, N. Y.

Application November 28, 1955, Serial No. 549,470

17 Claims. (Cl. 310—102)

The present invention relates to electromagnetic transmissions generally, and to electromagnetic transmission means for motor-driven vehicles in particular.

Conventional automatic transmissions for motor vehicles are based mainly on the principle of the liquid torque convertor and on the principle of the liquid clutch, which appear to be the best up-to-date principles for practical applications. However, all liquid automatic transmissions heretofore designed for motor vehicles still have many critical parts such as seals, valves, pumps, active frictional parts, such as friction clutches or friction bands, and many others, which make them expensive and not entirely dependable. To eliminate these critical parts or to replace them with other, more dependable and less expensive parts, is a difficult problem.

It is therefore an object of the present invention to provide novel automatic electromagnetic transmissions for motor conveyances and other mechanisms wherein many critical parts of the prior art are eliminated.

It is another object of the present invention to provide novel automatic electromagnetic transmission means for motor conveyances and other uses, having a very high starting torque as well as means for convenient speed control.

It is still another object of the present invention to provide novel automatic electromagnetic transmissions for motor-driven conveyances dispensing with seals, valves, pumps, friction clutches, friction bands and the like.

With these and other objects in view, which will become apparent from the following detailed description, the present invention will be clearly understood in connection with the accompanying drawing in which.

The novel automatic electromagnetic transmissions described hereinafter as part of this invention are based on the principle of intermediate rotors as described, defined and claimed in my co-pending patent application, Serial No. 549,331 filed on even date herewith.

Figure 1:
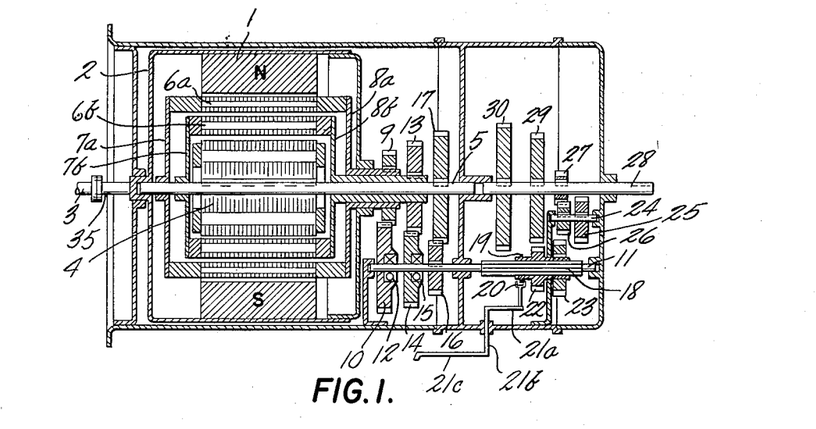
Fig. 1 illustrates schematically in central longitudinal section, an electromagnetic transmission according to the invention having as its impelling part a permanent magnet.

Fig. 1 illustrates schematically in central longitudinal section an automatic electromagnetic transmission with a permanent magnet as an impelling rotative part. This transmission is derived from an induction motor with intermediate rotors, as disclosed in my above-identified co-pending application, by the elimination of the stator and the replacement of its rotating magnetic field by a rotatable source of magnetic flux such as a rotatable permanent magnet, driven by a prime mover.

A rotatable two-pole permanent-magnet impeller 1 in the form of a ring, is secured to rotatable drum 2. The rotatable drum 2 is mounted on a shaft 35 connected to the prime-mover shaft 3. A conventional single-cage rotor 4 is keyed to the intermediate shaft 5. In the enlarged gap between the permanent-magnet impeller 1 and the conventional rotor 4 are nested two intermediate rotors 6a and 6b. The two intermediate rotors 6a and 6b are in the form of drums concentric with the conventional rotor 4, these drums having their electrically conductive parts formed as a squirrel cage and their magnetically permeable parts as laminated segments as shown in Fig. 5 of my aforementioned co-pending application or as laminated rings as shown in Fig. 6 of the same application. The electrical resistance of the cages of the individual rotors varies. The highest resistance is present in the cage of the rotor 6a; the rotor 6b has a medium resistance and the conventional rotor 4 has the lowest resistance. Each of the rotors 6a and 6b has on its end nearer to the shaft 35 a flange 7a and 7b respectively, serving as a bearing support on the opposite end a flange 8a and 8b respectively, which also serves as a bearing support.

On flange 8a is mounted a gear 9 which meshes with a gear 10 coupled through an overrunning clutch 12 to a shaft 11. On flange 8b is mounted a gear 13, which meshes with a gear 14 likewise coupled through an overrunning clutch 15 to shaft 11. On the same shaft 11 is carried a gear 16, which meshes with gear 17 rigidly secured to shaft 5. Shaft 11 has a splined extremity which slidably fits into internally grooved sleeve 18 to rotate with it.

On the sleeve 18 is rigidly mounted a ring 19, engaged by a fork 20. The fork 20 is connected with a lever 21a, shaft 21b and lever 21c which further may be linked with the control system. Sleeve 18 also rigidly supports two gears 22 and 23. Keyed to a shaft 24 are two gears 25 and 26. The gear 26 meshes with gear 27, which is rigidly secured to the output shaft 28. Gears 25, 26 and 27 are reversing gears. On the output shaft 28 are rigidly carried the normal forward gear 29 and the low-speed forward gear 30.

The operation of this type of automatic electromagnetic transmission is as follows:

When the permanent-magnet impeller 1, driven by the prime mover through the shaft 31 is rotating and all rotors 4, 6a and 6b are standing still, there are induced in them alternating currents whose frequency depends on the revolutions of the impeller, i. e. on the slip between the impeller and the rotors. The slip depends in turn on the load. The intermediate rotor 6a, which has the highest resistance in its cage and the highest gear ratio will respond to the heaviest load and so to the highest slip. With diminishing load, the slip decreases and the load is taken over by the intermediate rotor 6b having medium resistance and medium gear ratio and finally upon further load reduction by rotor 4, which has the lowest gear ratio and operates at the highest speed.

If the load starts to increase again, the operation is reversed. In all cases when the intermediate rotors 6a and 6b reach the speed of the permanent-magnet impeller 1, the overrunning clutches 12 and 15 release so that these two rotors do not exceed the speed of the impeller 1 and are free-wheeling without exerting any torque. The torque from the intermediate shaft 5 is transferred through the gears 17 and 16, and the shaft 11, to gears 22 and 23. When lever 21c is displaced, sleeve 18 slides on the shaft 11 in one or the other direction and gears 22 or 23 become disengaged from or engaged with one of the gears 30, 29, 25, so that the torque is transferred to the output shaft 28. Depending on the engaged gear, any one of several speeds, such as normal drive, low drive, neutral and reverse, can be obtained.

Figure 2:
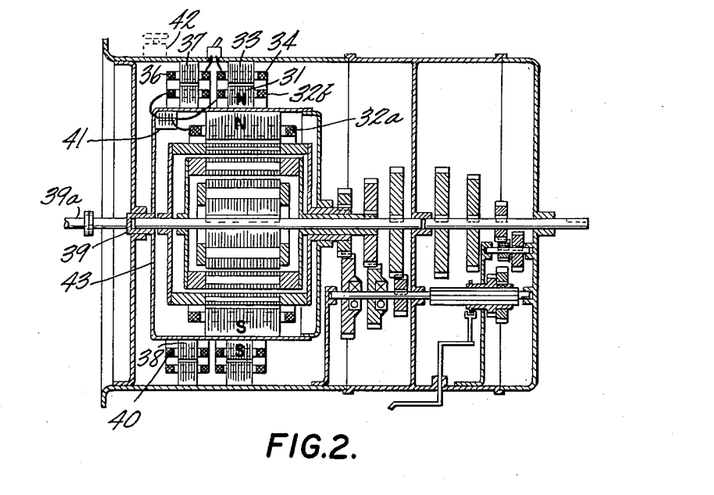
Fig. 2 illustrates schematically, in central longitudinal section, the same type of electromagnetic transmission as is illustrated in Fig. 1 except that the impelling part, instead of being a permanent magnet, is an electromagnet with self-excitation.

Fig. 2 illustrates a modification of the automatic electromagnetic transmission illustrated in Fig. 1. In this modification, instead of a permanent magnet serving as the impelling part, there is used an electromagnet with self-excitation. A two-pole rotatable electromagnetic impeller 31 is in the form of a ring with inside poles 31a and outside poles 31b, provided with two excitation coils designated 32a for the inside poles 31a and 32b for the outside poles 31b. The coils may be connected in parallel or in series with each other. The impeller 31 is secured to a drum 43 which is keyed to shaft 39. Around the impeller 31, separated from it by an air gap, is arranged a stationary armature 33 supported on the housing 33a and provided with a polyphase winding 34. This winding 34 is connected to the winding 36 of a stator 37 which latter is also supported on the housing 33a. Inside the stator 37, separated from it by a gap, is arranged an armature 38 mounted on the drum 43 and provided with an alternating-current winding 40 connected to the excitation coils 32a and 32b through the rectifier 41 carried by drum 43. Shaft 39, armature 38, rectifier 41, drum 43 with impeller 31, and all their auxiliary parts are rigidly joined together and rotatable as a unit. The rotors' intermediate and output shafts, all gears and their auxiliary parts are the same as in the transmission illustrated in Fig. 1. The operation is also the same except for the self-excitation, which occurs as follows:

When the transmission is not operating and all its rotative parts are standing still, a residual magnetic flux exists in the impeller 31. As soon as the rotatable parts driven by drive shaft 39a start to rotate, the outside poles 31b of the impeller 31 induce polyphase currents in the winding 34 which create in the winding 36 of the stator 37 a rotating magnetic field, whose speed and/or direction should differ from that of the armature 38, so that in the winding 40 of this armature there are induced alternating currents. These currents are rectified by rectifier 41 and energize the excitation coils 32a and 32b of the impeller 31.

Figure 10:
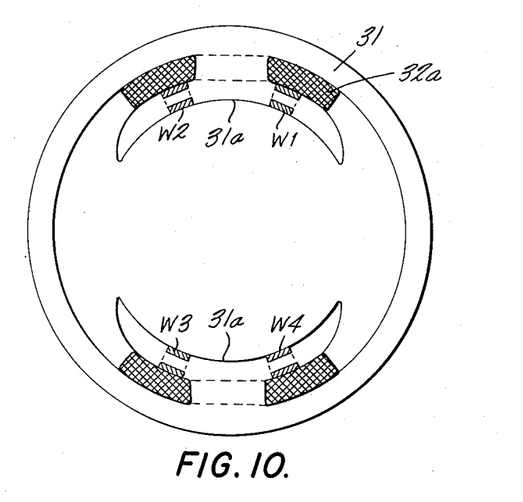
Fig. 10 is a cross section illustrating a two-pole impeller with four shading windings.

The outside poles 31b of impeller 31 are the excitation poles. As will be understood, the excitation is proportional to the speed of the prime mover. The inside poles 31a of the impeller 31 are the working poles which produce flux entraining the rotors in the same manner as the permanent-magnet poles do in the transmission illustrated in Fig. 1. In order to eliminate rectifier 41, alternating current may be used instead of direct current for the excitation of impeller poles 31a. Then the poles 31a of the impeller 31 must be provided with short-circuited shading windings, as shown in Fig. 10 and a rectifier is preferably inserted between the windings 34 and 36. If the feed back winding 34 is connected with winding 36 through the rheostat 42 instead through a disconnect switch, the transmission may operate as a speed control means. It will be understood that armatures 33, 38, impeller 31 and stator 37 together with their respective windings, as also their counterparts in succeeding embodiments, form part of a magneto-electric feed back loop serving for the regenerative energization of the impeller.

Figure 3:
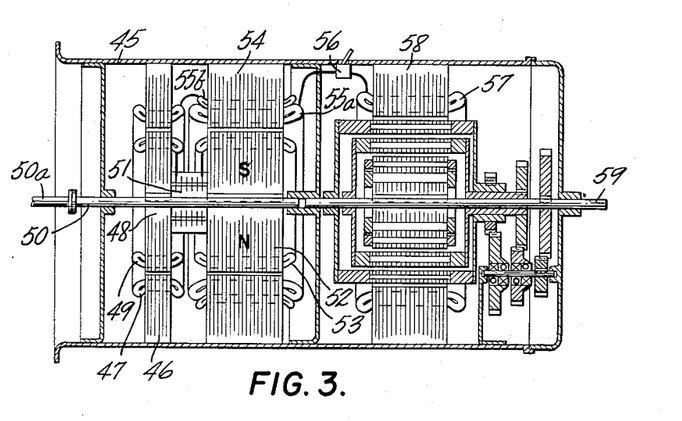
Fig. 3 illustrates schematically, in central longitudinal section, a modified type of automatic electromagnetic transmission according to the invention.

Fig. 3 illustrates another type of automatic electromagnetic transmission, which consists of an alternating-current generator with self-excitation, an induction motor with intermediate rotors and torque-increasing gears. A stator 46, supported on the housing 45, is provided with the polyphase winding 47. Inside the stator 46, and separated from it by an air gap, is arranged a rotative armature 48 which is provided with a winding 49 and keyed to an intermediate shaft 50. On the same shaft 50 is mounted a rectifier 51, and next to it is arranged an electromagnetic impeller 52 provided with an excitation coil 53. Surrounding the impeller 52, and separated from it by an air gap, is the stationary armature 54 supported on the housing 45 and provided with a compound polyphase winding consisting of a heavy duty winding section 55a serving as the working winding, and a smaller winding section 55b connected to the winding 47, serving for excitation. The winding 55a is connected to a composite polyphase winding 57 of a stator 58 through a multiple switch 56. Inside the stator 58 are arranged a conventional double-cage rotor and two intermediate rotors all coupled directly or through gears and double-action overrunning clutches to the output shaft 59. The construction and arrangement of all rotors, gears, double-action overrunning clutches and output shaft 59 is the same as in the induction motor with intermediate rotors described in my co-pending application, Serial No. 549,331 and illustrated in Fig. 8 thereof. Stator 58, winding 57, all rotors, gears, overrunning clutches and shafts constitute the motor part of the transmission.

The operation of this type of automatic electromagnetic transmission is as follows: When the transmission is not operating and all rotatable members are standing still, a residual flux exists in the rotative impeller 52. As soon as the rotatable parts driven by drive shaft 50a start to rotate, the poles of the impeller 52 induce currents in the polyphase winding sections 55a and 55b. The current of winding 55b enters the polyphase winding 47 and creates a rotating magnetic field in the stator 46. This rotating magnetic field induces alternating currents in the winding 49 of the rotative armature 48. These currents pass through the rectifier 51 where they become rectified and are fed to the excitation coil 53 as excitation direct current for impeller 52, thus strengthening its magnetic flux. The higher the rotating speed, the higher is the excitation. Further, the winding section 55a supplies the composite winding 57 with the polyphase currents which create a rotating magnetic field in the stator 58. The composite winding 57 has leads adapted to be interconnected in different combinations by the multi-pole switch 56, for the purpose of reversing or suppressing the rotating magnetic field or of changing its speed by varying the number of pole pairs. The mode of operation of the motor part of this transmission is the same as that of the induction motor with intermediate rotors described in my co-pending application, Serial No. 549,331 and illustrated in Fig. 8 thereof.

Figure 4:
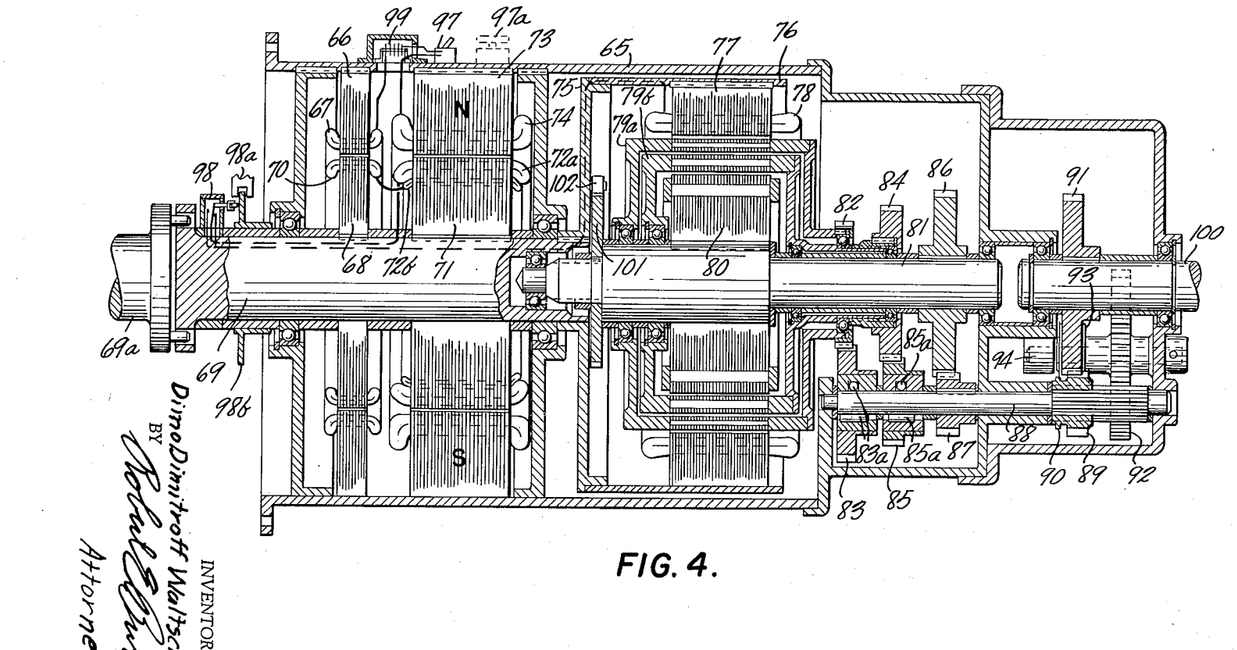
Fig. 4 illustrates in detail and in central longitudinal section another type of electromagnetic transmission similar to that of Fig. 3 but also comprising reversing gears.

Fig. 4, illustrates another type of automatic electromagnetic transmission consisting also of an alternating-current generator with self-excitation, an induction motor with intermediate rotors and torque-increasing gears. The advantages of this type of transmission are its smaller size and the fact that the rectifier, which is also smaller, is a stationary part. A stationary laminated armature 66 supported on the transmission housing 65 and provided with a winding 67 is connected to a rectifier 99. Inside the armature 66, separated from it by an air gap, is arranged a rotative laminated impeller 68 which is keyed to a shaft 69 and provided with a polyphase winding 70.

On the shaft 69 is mounted also a laminated armature 71 provided with compound polyphase winding 72a—72b. Surrounding the armature 71 and separated from it by an air gap is a stationary, two-pole, laminated impeller 73 supported on the transmission housing 65 and provided with an excitation coil 74. The excitation coil 74 is connected to a rectifier 99 through a disconnecting switch 97. Impeller 73 and armature 71 constitute a two-pole generator. On shaft 69 is mounted a disk 75. Disk 75 is rigid with a drum 76, to which is secured a laminated impeller 77, provided with a composite polyphase winding 78.

Shaft 69, impeller 68, armature 71, disk 75, drum 76, impeller 77, and their auxiliary parts together constitute one rotative unit, supported on two ball bearings. Shaft 69 is coupled to shaft 69a of the prime mover. Inside the impeller 77, separated from it and from one another by air gaps, are arranged two intermediate rotors 79a and 79b and one conventional single-cage rotor 80. The rotor 80 is keyed directly to intermediate shaft 81. The intermediate rotors 79a and 79b may have either one of the constructions described in my co-pending application and illustrated in Figs. 5, 6 and 7 thereof. Supported by ball-bearings, they are separately rotatable around the intermediate shaft 81. Impeller 77 and all rotors 79a, 79b, 80 constitute the motor unit of the transmission.

On the intermediate rotor 79a is mounted a gear 82, which meshes with gear 83 keyed to auxiliary shaft 88 through the overrunning clutch 83a. On the intermediate rotor 79b is mounted a gear 84 which meshes with gear 85 keyed to the auxiliary shaft 88 through another overrunning clutch 85a. On the intermediate shaft 81 is keyed a gear 86 which meshes with gear 87 rigidly keyed to the shaft 88. The shaft 88 is provided at its free end with longitudinal grooves slidably engaged by an internally grooved gear 89.

A ring 90, secured to gear 89 is engaged by a fork linked to the control lever system (not shown). Sliding of the gear 89 along the grooved portion of shaft 88 enables it to be engaged with a forward-drive gear 91, totally disengaged, or engaged with a reverse-drive gear 92. The forward-drive gear 91 is rigidly keyed to an output shaft 100 which is supported by ballbearings on the transmission housing 65.

The reverse gear 92, integral with the pinion 93, is rotatable on the shaft 94. The pinion 93 meshes constantly with forward-drive gear 91. If the prime mover is not self starting, it may be set in motion through output shaft 100 by means of a ratchet 101, keyed to intermediate shaft 81, and a pawl 102, supported on disk 75. When the shaft 81 starts to rotate faster than the shaft 69, the pawl 102 engages the teeth of the ratchet 101 and both shafts rotate together. Instead of the pawl and ratchet there may be used an overrunning clutch. Either type of unidirectional coupling also serves to exert a braking action wherever the shaft 81 rotates faster than the shaft 69.

The operation of this type of automatic electromagnetic transmission is as follows: When the transmission is not operating and all rotating parts are standing still a residual flux exists in the stationary impeller 73. As soon as the rotatable parts driven by the prime mover through shaft 69a start to rotate, the poles of the impeller 73 induce polyphase currents in the windings 72a and 72b. The currents generated in the winding 72b and flowing through the winding 70, create in the impeller 68 a rotating magnetic field, which rotates relatively to the impeller 68 itself, and to the stationary armature 66, in such manner that alternating currents are induced in the winding 67 of the stationary armature 66. These currents, rectified by rectifier 99, excite the poles of the stationary impeller 73, thereby strengthening its magnetic field; hence the higher the speed of the rotating parts, the higher is the excitation and the stronger are the alternating polyphase currents in the winding 72a as well as in the winding 72b.

While the currents from the winding 72b thus serve to energize the impeller 73, the currents from winding 72a pass through the multi-pole switch 98 into the composite polyphase winding 78 of the rotatable impeller 77, creating a magnetic field which rotates preferably in the direction of rotation of the impeller itself. The multi-pole switch 98 is actuated by fork 98a and slide ring 98b, both linked to the control system. The actual speed of the created rotating magnetic field is the sum of the mechanical speed of the rotating impeller 77 and of the relative synchronous speed of the field itself in respect to the impeller 77. The rotating magnetic field can be selectively produced by different pole pair numbers. Through changes in the number of pole pairs and in the direction of the rotating field there can be obtained different low speeds as well as speed reversal. The transmission is however preferably provided with mechanical reversing gears. Some of the low speeds may be used for braking purposes. The impelling rotating field envelops the intermediate rotors 79a and 79b and the rotor 80 in the same way as the rotating field does in the induction motor described in my co-pending application and illustrated in Fig. 8 thereof.

Switching from normal forward drive to neutral and reverse is performed by sliding the gear 90 along the grooved portion of the shaft 88. Neutral may be obtained also by disconnecting the excitation coil 74 by the switch 97. In the Fig. 4 gear 89 is shown meshed with normal forward gear 91. If winding 67 is connected with the excitation coil 74 through the rheostat 97a, the transmission may be used as an electromagnetic speed control means.

Figure 5:
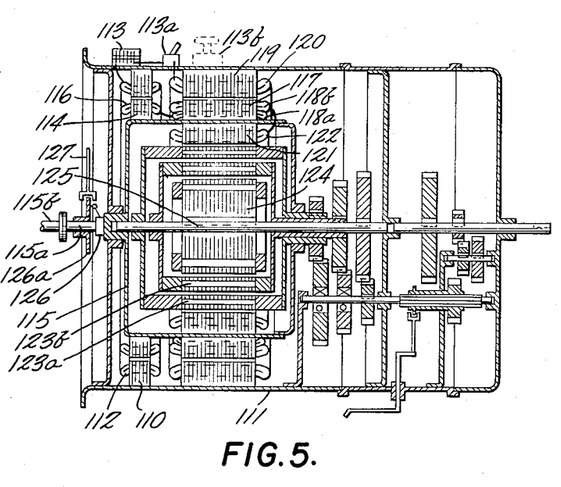
Fig. 5 illustrates schematically, in central longitudinal section, a modification of the electromagnetic transmission illustrated in Fig. 4.

Fig. 5 illustrates a modification of the automatic electromagnetic transmission illustrated in Fig. 4. The difference here is that the generator armature and the motor impeller are unified in one part and arranged radially with respect to the other main parts. The stationary laminated armature 110 is supported on the transmission housing 111 and provided with a winding 112 connected to a rectifier 113. Inside the armature 110, separated from it by an air gap, is arranged a rotative laminated impeller 114 secured to a drum 115 and provided with a polyphase winding 116. Drum 115 is mounted on a shaft 115a coupled with shaft 115b of a prime mover. On drum 115 is carried also a laminated armature 117 provided with compound polyphase windings 118a—118b.

Around the armature 117, separated from it by an air gap, is disposed a two-pole and laminated stationary electromagnetic impeller 119 supported rigidly on housing 111, provided with an excitation coil 120 connected to rectifier 113, through a multi-pole switch 113a. Impeller 119 and armature 117 compose a two-pole generator. On drum 115 is also mounted a laminated impeller 121 provided with a composite winding 122. Inside the impeller 121, separated by air gaps, are arranged two intermediate rotors 123a and 123b and also a single-cage rotor 124.

The rotor 124 is keyed directly to intermediate shaft 125. Impeller 121 and rotors 123a, 123b and 124 constitute the motor part of the transmission, the same as in the transmission shown in Fig. 4. Furthermore, all gears and overrunning clutches are the same as those shown in Fig. 4. A switch 126, slide ring 126a and lever 127 serve to switch the impeller winding 122 to low speed.

The operation of this transmission is the same as the operation of the transmission shown in Fig. 4.

Figure 6:
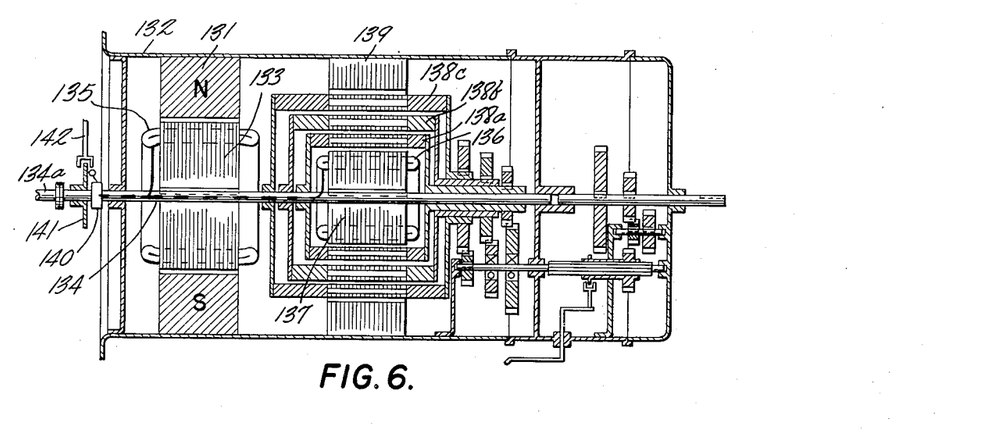
Fig. 6 illustrates schematically in central longitudinal section another modification of the electromagnetic transmission illustrated in Fig. 4.

Fig. 6 illustrates another modification of the transmission illustrated in Fig. 4. In this modification, the generator armature and the motor impeller are mounted on one shaft, which simplifies the construction. All rotors surround and rotate around the motor impeller. The generator impeller, instead of being an electromagnetic impeller with self-excitation, is a permanent-magnet impeller which eliminates the rectifier, its excitation coil, and some other parts.

A stationary, two-pole permanent-magnet impeller 131 is supported on housing 132. Inside the impeller 131, separated from it by an air gap is arranged a laminated armature 133, mounted on shaft 134 and provided with a polyphase winding 135. Impeller 131 and armature 133 constitute the generator section of the transmission. On the same shaft 134 is mounted an impeller 137, provided with a composite polyphase winding 136. Around the impeller 137 are arranged intermediate rotors 138a, 138b and 138c. Around the last rotor 138c, separated from it by an air gap, is disposed a stationary, laminated, magnetically permeable ring 139, supported on housing 132 and serving to close the magnetic field of impeller 137. Impeller 137, rotors 138a, 138b, 138c, and the laminated ring 139 constitute the motor section of the transmission.

Each rotor is joined to a gear. The rotor 138a, closest to the impeller 137 and having the highest resistance of its electrically conductive parts, has the highest gear ratio; rotor 138c, the one farthest from the impeller 137, has the lowest resistance of its electrical conductive parts and the lowest gear ratio; rotor 138b has a medium resistance and a medium gear ratio. Furthermore, all gears and overrunning clutches are the same as in the transmission illustrated in Fig. 4. A switch 140, actuated by a lever 142 and sliding ring 141, serves to switch the impeller winding 136 to low speeds. The operation of the transmission is the same as the operation of transmission shown in Fig. 4.

Figure 7:
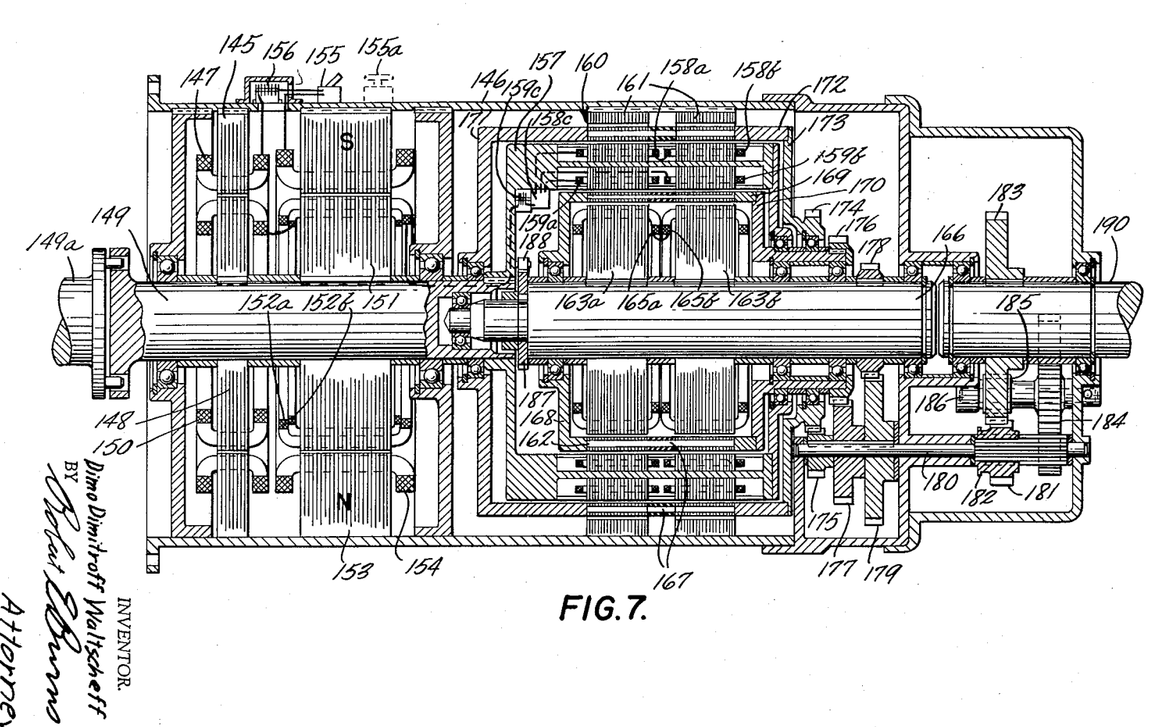
Fig. 7 illustrates in detail, in central longitudinal section, still another type of electromagnetic transmission according to the invention.

Fig. 7 illustrates another type of automatic electromagnetic transmission with intermediate rotors and torque-increasing gears, based on the principle of the induction motor described in my co-pending application and illustrated in Fig. 9 thereof, with the difference that here, instead of a rotating field, a rotative electromagnetic impeller is used. The advantage of this type of transmission is that the overrunning clutches, which appear in the automatic electromagnetic transmissions shown in the preceding figures, may be eliminated.

A stationary laminated armature 145 is supported on housing 146 and provided with winding 147, which is connected to rectifier 156. Inside the armature 145, separated from it by an air gap, is arranged a rotative laminated impeller 148, keyed to shaft 149 and provided with winding 150. Shaft 149 is coupled to the prime mover shaft 149a. Next to the impeller 148, mounted on the same shaft 149, is arranged a rotative laminated armature 151, provided with a compound polyphase winding 152a—152b. Around the armature 151, separated from it by an air gap, is arranged a two-pole, laminated, stationary electromagnetic impeller 153, supported on housing 146 and provided with excitation coil 154 which is connected through switch 155 to the secondary side of rectifier 156.

Winding section 152b is connected to winding 150. On shaft 149 is mounted a two-sectional rotative electromagnetic impeller 157, which has the form of a drum, provided with a two-sectional exterior excitation coil 158a—158b and also with a two-sectional interior excitation coil 159a—159b. Both coils are connected to a switch 158c, supported inside the impeller 157. Inside the impeller is also supported a rectifier 159c, the primary side of which is connected and the secondary side of which is connected through the switch 158c to one of the two sections of the interior and also of the exterior excitation coils 159a—159b—158a—158b, and from them back to switch 158c.

One of the sections of interior excitation coil 159a—159b is electrically displaceable by 180° with respect to the other section of the same excitation coil. Outside, around the impeller 157, separated from it by an air gap, is arranged an intermediate rotor 160, and around it two stationary, laminated, magnetically permeable rings 161, supported on the housing 146. Inside the impeller 157 is arranged an intermediate rotor 162 and a two-sectional rotor comprising identical sections 163a and 163b keyed to the intermediate shaft 166. The rotor sections 163a and 163b are provided with separate but interconnected, preferably low-resistance, heavy-wire windings 165a and 165b which are electrically 180° out of phase.

The intermediate rotors 160 and 162 have their middle sections 167 free from laminations. One end ring 168 of rotor 162 is extended and used as a bearing support. The opposite end ring 169 is secured to a flange 170, used also as a bearing support. Likewise end ring 171 of the intermediate rotor 160 is extended as a bearing support, and end ring 172 is secured to flange 173 used also as a bearing support. On the flange 173 is mounted a gear 174 which meshes with gear 175 keyed to auxiliary shaft 180.

On flange 170 is mounted a gear 176, which meshes with gear 177 keyed also to auxiliary shaft 180. On the intermediate shaft 166 is mounted a gear 178 which meshes with gear 179 keyed also to auxiliary shaft 180. On its other extremity the splined auxiliary shaft 180 is provided with an internally grooved gear 181. This gear 181 carries a ring 182 engaged by a fork (not shown), which is linked to a control lever system, likewise not shown.

A sliding of gear 181 along the grooved portion of shaft 180 enables it to be engaged with forward-drive gear 183, totally disengaged, or engaged with the reversing gear 184. The forward-drive gear 183 is rigidly keyed to an output shaft 190, which is supported by ball bearings on the housing 146. The reverse gear 184 is integral with the pinion 185 and rotatable on shaft 186. The pinion 185 meshes constantly with forward-drive gear 183.

As in embodiment of Fig. 4 the prime mover may be started, if necessary by rotating the output shaft 190; for this purpose there are provided a ratchet 187, keyed to intermediate shaft 166 and a pawl 188 supported on impeller 157. When the shaft 166 starts to rotate faster than shaft 149, the pawl 188 engages the teeth of wheel 187 and both shafts rotate together. Again, instead of the pawl and the ratchet, there may be used an overrunning clutch.

The operation of this type of automatic electromagnetic transmission is as follows:

When the transmission is not operating, residual magnetic flux exists in the stationary impeller 153. As soon as the rotatable parts driven by the prime mover through shaft 149a start to rotate, the poles of impeller 153 induce polyphase currents in the windings 152a and 152b. The currents from the winding 152b, upon traversing the polyphase winding 150, create in the impeller 148 a rotating magnetic field which rotates relatively to the impeller 148 itself, and to the stationary armature 145, in such manner as to induce alternating currents in the winding 147. These currents, rectified by rectifier 156, pass through the switch 155 into the excitation coil 154, thereby exciting the poles of the stationary impeller 153 strengthening its magnetic flux. The higher the speed of the prime mover, the higher is the excitation, and the stronger are the alternating polyphase currents in the winding 152a as well as in the winding 152b.

As in preceding embodiments, the currents from winding 152b serve to energize the impeller 153 whereas currents from winding 152a pass through the switch 158c and rectifier 159c into the excitation coils 158a, 158b, 159a and 159b of the impeller 157.

When the transmission is not operating, or when the prime mover runs at low speed, the switch 158c is automatically returned to the position in which the excitation coils 159a and 159b are energized 180° out of phase to one another. The resulting field activates the double-sectional rotor 163a, 163b, having its windings 165a and 165b also 180° out of phase and having the highest gear ratio corresponding to lowest speed and highest torque.

The output shaft 190 should start to rotate at this speed. When the prime mover, and so the shaft 149, reaches a predetermined speed, the excitation currents flowing through the switch 158c attain a value sufficient to actuate the switch and to restore both windings 159a and 159b to in-phase energization. Thereupon the rotor 163a—163b becomes inactivated and the intermediate rotor 162 activated. The rotor 162 has a medium gear ratio and operates at medium speed and medium torque. Upon a further increase in prime-mover speed, the switch 158c automatically disconnects the windings 159a, 159b and connects the windings 158a and 158b in phase to each other thereby inactivating both rotors 163a—163b and 162 and activating the intermediate rotor 160 which has the lowest gear ratio and drives the output shaft at the highest speed.

When the speed of the prime mover is reduced, the procedure occurs in reverse. If the disconnecting switch 155 is replaced by a rheostat 155a, the system becomes a transmission with adjustable speed.

This type of transmission can appear also in several modifications: generator-motor type similar to the transmission illustrated in Figs. 3, 4, 5 and 6; permanent-magnet type as in Fig. 1; combination with other types of intermediate rotors such as loop-type intermediate rotors, axially arranged rotors, etc.; combination with an additional intermediate rotor for reversing gears, and others.

Figure 8:
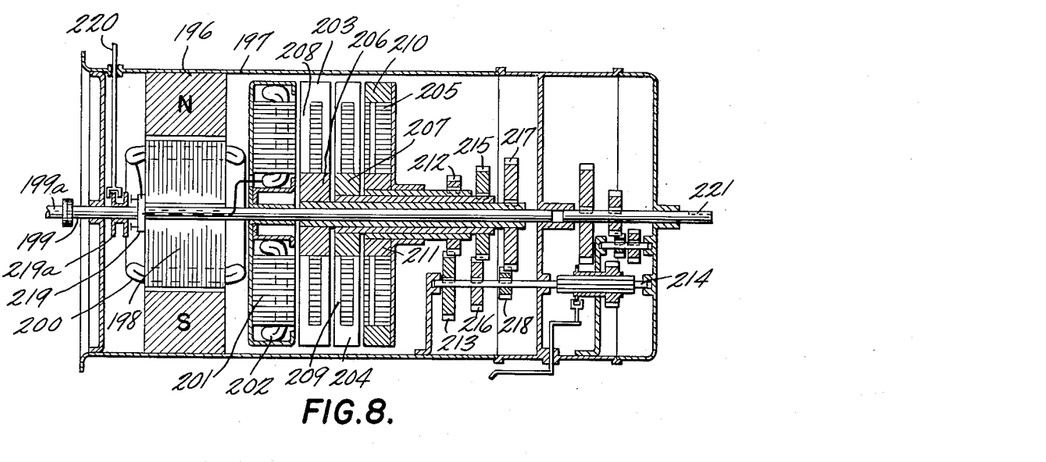
Fig. 8 illustrates schematically in central longitudinal section still another modification of the same type of electromagnetic transmission as is illustrated in Fig. 4.

Fig. 8 illustrates still another modification of the automatic electromagnetic transmission illustrated in Fig. 4. In this transmission, the main parts of the motor section, i. e. motor impeller and rotors, are axially juxtaposed and the intermediate rotors are of the loop-type described in my copending application and illustrated in Figs. 11, 12 and 13 thereof, which permits the elimination of the overrunning clutches appearing in other herein types of electromagnetic transmissions illustrated herein.

A stationary two-pole permanent-magnet impeller 196 is supported on housing 197. Inside the impeller 196, separated from it by an air gap, is a laminated armature 198 mounted on shaft 199 and provided with a polyphase winding 200. Shaft 199 is coupled to prime mover shaft 199a. Impeller 196 and armature 198 constitute the generator unit of the transmission. On the same shaft 199 is mounted a radially arranged impeller 201, provided with a composite polyphase winding 202. Next to it, also radially arranged, are two intermediate rotors 203 and 204, and one conventional rotor 205.

The laminations of the impeller 201 and of all rotors run preferably in a circle or are spirally concentric to shaft 199. The slots in them extend radially. The portions of the winding 202 of impeller 201 lying in its radially arranged slots run also radially. The two intermediate rotors comprise short-circuited armatures, each provide with a respective ring 206 and 207. To these rings are rigidly secured for mechanical supported, and preferably electrically connected, the loops 208 and 209 which link the laminated magnetically permeable cores. On their outer circumferences the loops are insulated from one another. The conventional rotor 205, which is also a short-circuited armature, has two concentrically arranged rings, i. e. an outside ring 210 and an inside ring 211. The rings are interconnected by bars which lie in the radially running slot of the laminated core similar to the spokes of a wheel.

Each one of the three rotors is keyed to a respective hollow shaft rotatable around the shaft 199. Each hollow shaft carries a gear. To the conventional rotor 205, which has the highest resistance of its electrically conductive parts and which is farthest from the impeller 201, corresponds the smallest gear 212 meshing with a large gear 213 rigidly secured to the auxiliary shaft 214. To the intermediate rotor 204, having a medium resistance of its electrically conductive parts, corresponds the medium-size gear 215 which meshes with a medium-size gear 216 also rigidly secured to auxiliary shaft 214. To the intermediate rotor 203, which has the lowest resistance of its electrically conductive parts and is closest to the impeller 201, corresponds the largest gear 217 which meshes with a small gear 218 also rigidly secured to auxiliary shaft 214.

Furthermore, this transmission is provided with reversing gears, the same as the reversing gears of the transmission shown in Figs. 4, 5 and 6, and with a switch 219 and lever 220 for switching to low speeds.

The operation of this automatic transmission is as follows:

As the prime mover starts to rotate, its shaft 199a drives shaft 199 and all parts keyed to it. The poles of the permanent-magnet impeller 196 induce polyphase currents in the winding 200 which, upon traversing the composite winding 202, create a rotating magnetic field in the impeller 201, the same as in the transmission modifications shown in Figs. 4, 5 and 6. Further, the operation is the same as that of the induction motor described in my co-pending application and illustrated in Figs. 11 and 12 thereof.

To the highest slip responds the rotor which is farthest from the impeller 201, i. e. the conventional high-resistance rotor 205, having the highest gear ratio and exerting the highest torque. To a medium slip responds the medium rotor 204, and to the lowest slip responds the low-resistance rotor 203, i. e. the one which is closest to the impeller 201 and operates at the highest speed. Lower speeds are obtained in the same way as with the other modifications shown in Figs. 4, 5, and 6.

Figure 9:
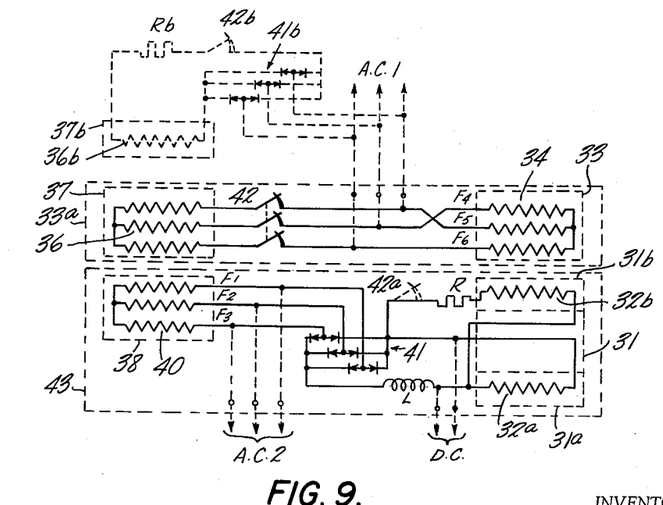
Fig. 9 illustrates a schematic of the inductive feed back self-excitation circuit of the transmission illustrated in Fig. 2.

Fig. 9 is a schematic diagram of the inductive feedback self-excitation circuit of the transmission illustrated in Fig. 2 is well as in Figs. 3, 4, 5 and 7. Parts are indicated by the same reference numerals as in Fig. 2.

The leads F1, F2 and F3 of the polyphase winding 40 of the armature 38 carried by the rotatable drum 43 are connected to the primary side of the rectifier 41. Each lead of the secondary side of the rectifier 41 is divided into two branches. One branch of each of the leads are connected to the excitation coil 32a of the impelling poles 31a through an inductance L which reduces the ripples of the rectified current. The other branches of the secondary leads of the rectifier are connected to the excitation coil 32b of the feedback excitation poles 31b through a resistance R to reduce the excitation current to the required value. The leads F4, F5 and F6 of the polyphase winding 34 of the stationary armature 33 supported on the housing 33a are connected through rheostats 42 to the polyphase winding 36 of the stator 37 likewise supported on the housing 33a. In order to reverse the direction of the rotating field, the leads F5 and F6 are crossed as shown. The operation of this feedback self-excitation system is as explained in the description of the transmission shown in Fig. 2. In case the part 43 is selected as the stationary part, instead of being rotatable, a rheostat 42a in the lead between the rectifier 41 and coil 32b is used instead of the rheostat 42.

The inductive feedback self-excitation system of Fig. 9 can also be used as a direct or alternating current generator. In case it is used as a D. C. generator, the leads designated D. C. are used as the direct current output leads. In case the system is to be used as an A. C. generator, the leads designated A. C. 1 and A. C. 2 may be used as the alternating current output depending on whether part 33a or part 43 is stationary.

Alternatively the leads F4, F5 and F6 can be connected through another rectifier 41b similar to rectifier 41 and a rheostat 42b similar to rheostat 42a and resistance Rb to an excitation winding 36b similar to the winding 32b for exciting a fixed pole 37b. This eliminates the rheostat 42, polyphase winding 36 and stator 37.

Fig. 10 illustrates the two inside poles 31a of the impeller 31 of Fig. 2 with form shading windings W1, W2, W3 and W4, two for each pole. The windings W1 to W4 are symmetrically arranged to eliminate a rotating magnetic field which otherwise could be created because of an asymmetry and phase displacement of the currents in the windings 32a and the windings W1 to W4.

While I have shown and described a number of embodiments of the present invention, it is to be understood that these embodiments are given as examples only, and that other modifications are possible within the scope of the present invention as determined by the objects in the present disclosure and the appended claims.

What I claim as new and useful, and desire to secure by Letters Patent is as follows:

1. An electromagnetic transmission torque converter comprising an input shaft to be driven by a prime mover, inductive impeller means coupled with said input shaft and adapted to produce a rotating magnetic field upon rotation of said input shaft, a plurality of rotors coaxial with said impeller means arranged to be impelled directly by said field, rotatable output means, torque converting members providing driving connections between said rotors and said output means with different speed ratios between the respective rotors and said output means, said rotors having electrically conductive components and magnetically permeable components arranged to provide paths with progressively proportioned path-to-path reluctance and regressively proportioned path-to-path magnetic reactance.

2. An electromagnetic transmission-torque converter according to claim 1, wherein said impeller means comprises a permanent magnet.

3. An electromagnetic transmission-torque converter according to claim 1, wherein said impeller means comprises an electromagnet including coil means for producing a magnetic field and means for energizing said coil means.

4. An electromagnetic transmission-torque converter according to claim 1, wherein said impeller means comprises a magnetically permeable body including coil means for producing a rotating magnetic field and means for energizing said coil means.

5. An electromagnetic transmission-torque converter according to claim 1, wherein said impeller means comprises a stator wound to produce a rotating magnetic field and an alternator driven by said input shaft and electrically coupled to said stator.

6. An electromagnetic transmission-torque converter according to claim 1, further comprising a rotatable support coupled with said input shaft, said impeller means being carried on said support.

7. An electromagnetic transmission-torque converter comprising an input shaft to be driven by a prime mover, rotatable inductive impeller means divided into sections coupled with said input shaft and adapted to produce phase displaceable rotating magnetic fields in said sections upon rotation of said primary shaft, switch means for selectively energizing said means for producing rotating magnetic fields in same or in opposite phase, a plurality of rotors coaxial with said field producing means arranged to be impelled directly by said rotating magnetic fields, output means, torque converting members providing driving connections between said rotors and said output means with different speed ratios between the respective rotors and said output means, said rotors including a first rotor having sections facing the sections of said impeller means and provided with electrically conductive components interconnected in the same phase and also a second rotor having sections facing the sections of said impeller means and provided with electrically conductive components interconnected in phase opposition.

8. An electromagnetic transmission-torque converter according to claim 7, further including at least one additional rotor having electrically conductive components arranged to provide paths with progressively proportional path-to-path reluctance and regressively proportioned path-to-path magnetic reactance.

9. An electromagnetic transmission-torque converter according to claim 7, wherein said impeller means comprises an electromagnet subdivided into sections and including coil means for producing magnetic fields in said sections and means for energizing said coil means.

10. An electromagnetic transmission-torque converter according to claim 7, wherein said impeller means comprises a magnetically permeable body subdivided into sections and including coil means for producing rotating magnetic fields in said sections and means for energizing said coil means.

11. An electromagnetic transmission-torque converter according to claim 7, further comprising a rotatable support coupled with said input shaft, said impeller means being carried on said support.

12. In an electromagnetic device adapted to serve as a source of inducto-motive power an input shaft adapted to be driven by a prime mover, generator means comprising a first set of coils electrically connected to each other and coupled to said input shaft and a second set of coils also electrically connected to each other, whereby each coil of said first set of coils faces a coil of said second set of coils, said first set of coils and said second set of coils being in position to exercise a relative rotation to each other thus being inductively coupled to compose a closed inductive feedback loop for regenerative energization of said generator means upon rotation of said input shaft.

13. Electromagnetic device according to claim 12, wherein said feedback loop includes rectifier means.

14. Electromagnetic device according to claim 12, wherein said feedback loop includes means for variably controlling said re-energization of said generators.

15. An electromagnetic transmission-torque converter comprising an input shaft adapted to be driven by a prime mover, impeller means adapted to produce a rotating magnetic field, a plurality of rotors coaxial with said field producing means, all of said rotors being disposed in said field to be impelled directly by said field, output means, torque converting members providing driving connections between said rotors and said output means with different speed ratios respectively, generator means coupled with said input shaft and electrically connected to said impeller means to supply current to said impeller means, said generator means comprising a first set of coils electrically connected to each other and coupled to said input shaft and a second set of coils also electrically connected to each other, whereby each coil of said first set of coils is facing a coil of said second set of coils, said first set of coils and said second set of coils being in position to exercise a relative rotation to each other thus being inductively coupled to compose a closed inductive feedback loop for regenerative energization of said generator means upon rotation of said input shaft.

16. An electromagnetic transmission torque converter according to claim 15, wherein said impeller comprises coil means and the connections between said generator and impeller comprise switch means controlled by the output of said generator means for controlling said rotating field by modifying the connection of said coil means.

17. Inducto-motive power apparatus comprising means for producing a rotating magnetic field, a plurality of rotors coaxial with said field producing means, all of said rotors being disposed in said field to be impelled directly by said field, output means, torque converting members providing driving connections between said rotors and said output means with different speed ratios respectively, at least one of said rotors surrounding said means for producing a rotating magnetic field.

References Cited in the file of this patent

UNITED STATES PATENTS

| | | |
|---|---|---|
| 709,848 | Creveling | Sept. 23, 1902 |
| 1,242,714 | Neuland | Oct. 9, 1917 |
| 1,245,762 | Neuland | Nov. 6, 1917 |
| 1,386,524 | Neuland | Aug. 2, 1921 |
| 1,817,660 | Winther et al. | Aug. 4, 1931 |
| 2,414,287 | Crever | Jan. 14, 1947 |
| 2,465,006 | Bowes et al. | Mar. 22, 1949 |
| 2,546,736 | Fry et al. | Mar. 27, 1951 |

FOREIGN PATENTS

| | | |
|---|---|---|
| 28,438 | Great Britain | of 1908 |
| 28,940 | Great Britain | of 1911 |